United States Patent
Jacobson

(10) Patent No.: US 10,050,438 B2
(45) Date of Patent: Aug. 14, 2018

(54) STACKED POWER CONVERTER ASSEMBLY

(71) Applicant: Raytheon Company, Waltham, MA (US)

(72) Inventor: Boris S. Jacobson, Westford, MA (US)

(73) Assignee: RAYTHEON COMPANY, Waltham, MA (US)

(*) Notice: Subject to any disclaimer, the term of this patent is extended or adjusted under 35 U.S.C. 154(b) by 348 days.

(21) Appl. No.: 14/885,096

(22) Filed: Oct. 16, 2015

(65) Prior Publication Data

US 2017/0110878 A1    Apr. 20, 2017

(51) Int. Cl.
| | |
|---|---|
| *H02J 1/00* | (2006.01) |
| *H02J 3/38* | (2006.01) |
| *H02J 9/00* | (2006.01) |
| *H02M 3/04* | (2006.01) |
| *H02M 7/06* | (2006.01) |
| *G01S 1/00* | (2006.01) |
| *H01Q 1/00* | (2006.01) |

(52) U.S. Cl.
CPC .......... *H02J 1/00* (2013.01); *G01S 1/00* (2013.01); *H01Q 1/00* (2013.01); *H02M 3/04* (2013.01); *H02M 7/06* (2013.01)

(58) Field of Classification Search
CPC .... H02J 1/00; H01Q 1/00; G01S 1/00; H02M 3/04; H02M 7/06
USPC ........................................................ 307/23
See application file for complete search history.

(56) References Cited

U.S. PATENT DOCUMENTS

| | | | |
|---|---|---|---|
| 3,740,640 A | 6/1973 | Pittman et al. | |
| 4,320,307 A | 3/1982 | Schierjott | |
| 4,724,441 A | 2/1988 | Fithian et al. | |
| 4,942,353 A | 7/1990 | Herbert et al. | |
| 4,977,301 A | 12/1990 | Maehara et al. | |
| 4,978,906 A | 12/1990 | Herbert et al. | |
| 5,312,674 A | 5/1994 | Haertling et al. | |

(Continued)

FOREIGN PATENT DOCUMENTS

| | | |
|---|---|---|
| GB | 2517931 A | 3/2015 |
| WO | 2013101249 A1 | 7/2013 |

OTHER PUBLICATIONS

Moody et al., "Electrical power systems for space based radar satellites", Energy Conversion Engineering, Aug. 6-11, 1989 Conference, 1989 (IECEC-89), Proceedings of the 24th Intersociety.

(Continued)

*Primary Examiner* — Richard Tan
(74) *Attorney, Agent, or Firm* — Cantor Colburn LLP

(57) ABSTRACT

An antenna-based modular power system includes a prime power supply configured to generate a first alternating current (AC) power signal having a first AC voltage level. At least one transformer is configured to convert the first AC signal into a second AC signal having a second AC voltage level less than the first AC voltage level. At least one Transmit or Receive Integrated Microwave Module (T/RIMM) dual power converter antenna array is in signal communication with the at least one transformer. The at least one T/RIMM dual power converter antenna array includes at least one load, and an AC/DC converter is embedded therein to convert the second AC signal into a DC power drive signal to energize the at least one load.

19 Claims, 8 Drawing Sheets

(56) References Cited

U.S. PATENT DOCUMENTS

| | | | |
|---|---|---|---|
| 5,602,554 A | 2/1997 | Cepas et al. | |
| 5,703,565 A * | 12/1997 | Herring | G08B 13/2471 |
| | | | 323/355 |
| 5,745,981 A | 5/1998 | Roshen et al. | |
| 5,777,539 A | 7/1998 | Folker et al. | |
| 5,959,522 A | 9/1999 | Andrews | |
| 5,973,923 A | 10/1999 | Jitaru | |
| 5,990,776 A | 11/1999 | Jitaru | |
| 5,999,078 A | 12/1999 | Herbert | |
| 6,108,526 A | 8/2000 | Van Der Plas | |
| 6,215,202 B1 * | 4/2001 | Luongo | H02J 15/00 |
| | | | 307/23 |
| 6,445,272 B1 | 6/2002 | Mercado et al. | |
| 6,628,531 B2 | 9/2003 | Dadafshar | |
| 6,727,793 B2 | 4/2004 | Piechnick | |
| 6,820,321 B2 | 11/2004 | Harding | |
| 6,847,284 B2 | 1/2005 | Gamou et al. | |
| 6,856,283 B2 | 2/2005 | Jacobson et al. | |
| 7,084,728 B2 | 8/2006 | Hyvonen | |
| 7,187,263 B2 | 3/2007 | Vinciarelli | |
| 7,248,138 B2 | 7/2007 | Chiang et al. | |
| 7,262,680 B2 | 8/2007 | Wang | |
| 7,304,862 B2 | 12/2007 | Busletta et al. | |
| 7,361,847 B2 | 4/2008 | Dunn et al. | |
| 7,382,219 B1 | 6/2008 | Lee | |
| 8,089,331 B2 | 1/2012 | Jacobson et al. | |
| 2002/0044433 A1 | 4/2002 | Inoue et al. | |
| 2004/0257271 A1 | 12/2004 | Jacobson et al. | |
| 2005/0189566 A1 | 9/2005 | Matsumoto et al. | |
| 2007/0221267 A1 | 9/2007 | Fornage | |
| 2008/0123312 A1 | 5/2008 | Cheng et al. | |
| 2008/0304292 A1 | 12/2008 | Zeng et al. | |
| 2010/0079341 A1 * | 4/2010 | Kenington | H01Q 1/246 |
| | | | 342/368 |
| 2013/0051082 A1 | 2/2013 | Lee et al. | |
| 2014/0211521 A1 | 7/2014 | Mazumder | |
| 2014/0340940 A1 | 11/2014 | Ouyang et al. | |
| 2015/0029761 A1 | 1/2015 | Trinh et al. | |

OTHER PUBLICATIONS

Qiankun et al, "Design of the APF for radar power system based on multi-resolution control", Radar Conference 2013, IET International, Apr. 14-16, 2013.

International Search Report for PCT/US2016/055247, dated Dec. 19, 2016, 8 pages.

Invitation to Pay Additional Fees for PCT Application No. PCT/US2015/049602, dated Dec. 23, 2015, pp. 1-7.

* cited by examiner

STACKED POWER CONVERTER ASSEMBLY

BACKGROUND

The present disclosure relates generally to power converter systems, and more particularly, to a power converter system of a vehicle.

Vehicles typically include multi-phase power distribution systems to deliver power to one or more various electronic sub-systems. In cases where power distribution systems are installed on very large vehicles, such as sea vessels for example, it may be necessary to distribute power to one or more sub-system located a large distance away from the prime power source. Referring to FIG. 1, for example, a sea vessel 100 including a conventional multi-phase alternating current (AC) power system 102 is illustrated. The multi-phase AC power system 102 is configured to distribute power generated at a prime power source 104 to one or more loads 106. The loads 106 include one or more transmit and receive circuits such as, for example, a Transmit or Receive Integrated Microwave Module (T/RIMM) antenna arrays.

Conventional T/RIMM antenna arrays include a microwave signal processing unit (not shown) and a control signal processing unit (not shown). The microwave signal processing unit includes a number of microwave or RF frequency processing components for processing radar signals. The control signal processing unit includes a number of signal processing components selectively interconnected with the microwave signal processing components for providing control signals thereto. These T/RIMM antenna arrays 106 operate according to a DC voltage supply. However, conventional T/RIMM antenna arrays 106 are incapable of individually converting the prime power into a DC voltage. Moreover, it is not uncommon for the T/RIMM antenna arrays 106 to be located at extremely far distances away from the prime power source 104. For example, the prime power source 104 may be located at the stern 108 of the sea vessel 100, while the T/RIMM antenna arrays 106 are located at the bow 110 of the vessel 100. The distances between the stern 104 and the bow 106 can reach distances of over 500 feet (ft), for example.

To facilitate the distribution of prime power across such large distances and convert voltage from AC/DC, the conventional multi-phase AC power system 102 includes one or more intermediate power distribution sub-systems 112. The intermediate power distribution sub-systems distribute power between the prime power source 104 and a respective antenna array 106 using a multitude of large bulky cables/buses 114 sized to handle the high power. The intermediate power distribution sub-system 112 typically includes, for example, various multiphase AC voltage transfer switches 116 and a power converter (e.g., AC-DC) 118. The AC voltage transfer switches 116 maintain power continuity while distributing the power through the power cables/buses 114. The AC-DC converter 118 rectifies the prime power and outputs a stepped-down DC voltage to the antenna arrays 108. As mentioned above, however, the multiple power cables/buses 114 used to distribute the prime power between the prime power source 104 and the loads 106, e.g., the T/RIMM antenna arrays 106, must be sized to handle extremely high power ratings. Therefore, implementing a multitude of these conventional power cables/buses 114 in combination with the intermediate power distribution sub-system 112 and bus transfer switches 116 adds excessive and undesirable weight to the sea vessel.

SUMMARY

According to a non-limiting embodiment, an antenna-based modular power system comprises a prime power supply configured to generate a first alternating current (AC) power signal having a first AC voltage level. At least one transformer is configured to convert the first AC signal into a second AC signal having a second AC voltage level less than the first AC voltage level. At least one Transmit or Receive Integrated Microwave Module (T/RIMM) dual power converter antenna array is in signal communication with the at least one transformer. The at least one T/RIMM dual power converter antenna array including at least one load, and an AC/DC converter is embedded therein to convert the second AC signal into a DC drive signal to energize the at least one load.

According to another embodiment, a Transmit or Receive Integrated Microwave Module (T/RIMM) dual power converter antenna array comprises a plurality of transmit/receive circuits configured to energize at least one power amplifier. Each transmit/receive circuit comprises an AC/DC converter configured to convert an AC signal into a first DC power signal having a first DC power level. Each transmit/receive circuit further comprises a DC/DC converter configured to convert the first DC power signal into a second DC power signal having a second DC power level less than the first DC power level. Each transmit/receive circuit further comprises a transmit/receive (T/R) modulation circuit configured to modulate the second DC power signal to generate a PWM drive signal, wherein the PWM drive signal energizes the at least one power amplifier.

According to another embodiment, a method of controlling a Transmit or Receive Integrated Microwave Module (T/RIMM) dual power converter antenna array comprises energizing at least one power amplifier using a plurality of transmit/receive circuits. The operation of energizing each transmit/receive circuit includes converting an AC signal into a first DC power signal having a first DC power level. The operation of energizing each transmit/receive circuit further includes converting the first DC power signal into a second DC power signal having a second DC power level less than the first DC power level, and modulating the second DC power signal to generate a PWM drive signal that energizes the at least one power amplifier. The method further comprises distributing power among the plurality of transmit/receive circuits to activate a first transmit/receive circuit while deactivating remaining transmit/receive circuits so as to execute at least one diagnostic test to diagnose at least one of an AC/DC converter configured to generate the first DC power signal and a DC/DC converter configured to generate the second DC power signal.

Additional features are realized through the techniques of the present invention. Other embodiments and features of the invention are described in detail herein and are considered a part of the claimed invention. For a better understanding of the invention with the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Unlike conventional multi-phase alternating current (AC) power distribution systems that implement heavy and bulky (e.g., low gauge) power cables/buses and/or multi-phase bus transfer switches installed independently from one or more loads, at least one embodiment of the disclosure provides an antenna-based modular power system that includes a three-phase transformer coupled to a bus transfer switching unit to distribute three-phase AC prime power to one or more remotely located T/RIMM dual power converter antenna arrays. Each T/RIMM dual power converter antenna array is configured to perform the majority of the power conversation processing. Accordingly, conventional intermediate power conversion sub-systems and multiple large bulky power cables/buses and multiphase bus transfer switches are unnecessary and can be omitted. In this manner, a smaller, lighter and a more efficient power system can be implemented on the vehicle compared to the conventional multi-phase alternating current (AC) power distribution systems.

For instance, at least one embodiment provides a T/RIMM dual power converter antenna array having an integrated AC/DC converter and a DC/DC converter. In this manner, a T/RIMM dual-power converter antenna array is provided that performs Power Factor Correction (PFC) and lower Total Harmonic Distortion (THD) while isolating the prime power from pulsed loads. Accordingly, point of load (POL) voltage DC-DC conversion is achieved according to fast response times (e.g., approximately 10-20 microseconds) which maximizes power density and end-to-end power chain efficiency.

Figure 2:
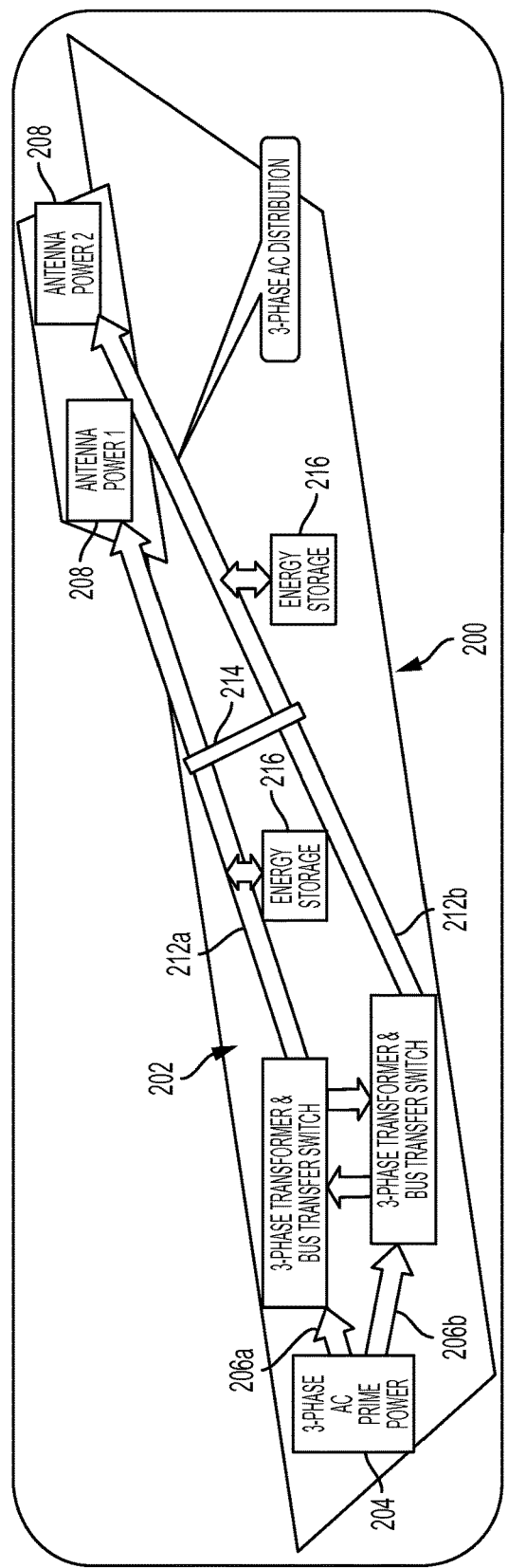
FIG. 2 illustrates an antenna-based modular power system in a vehicle according to an embodiment.
Figure 3:
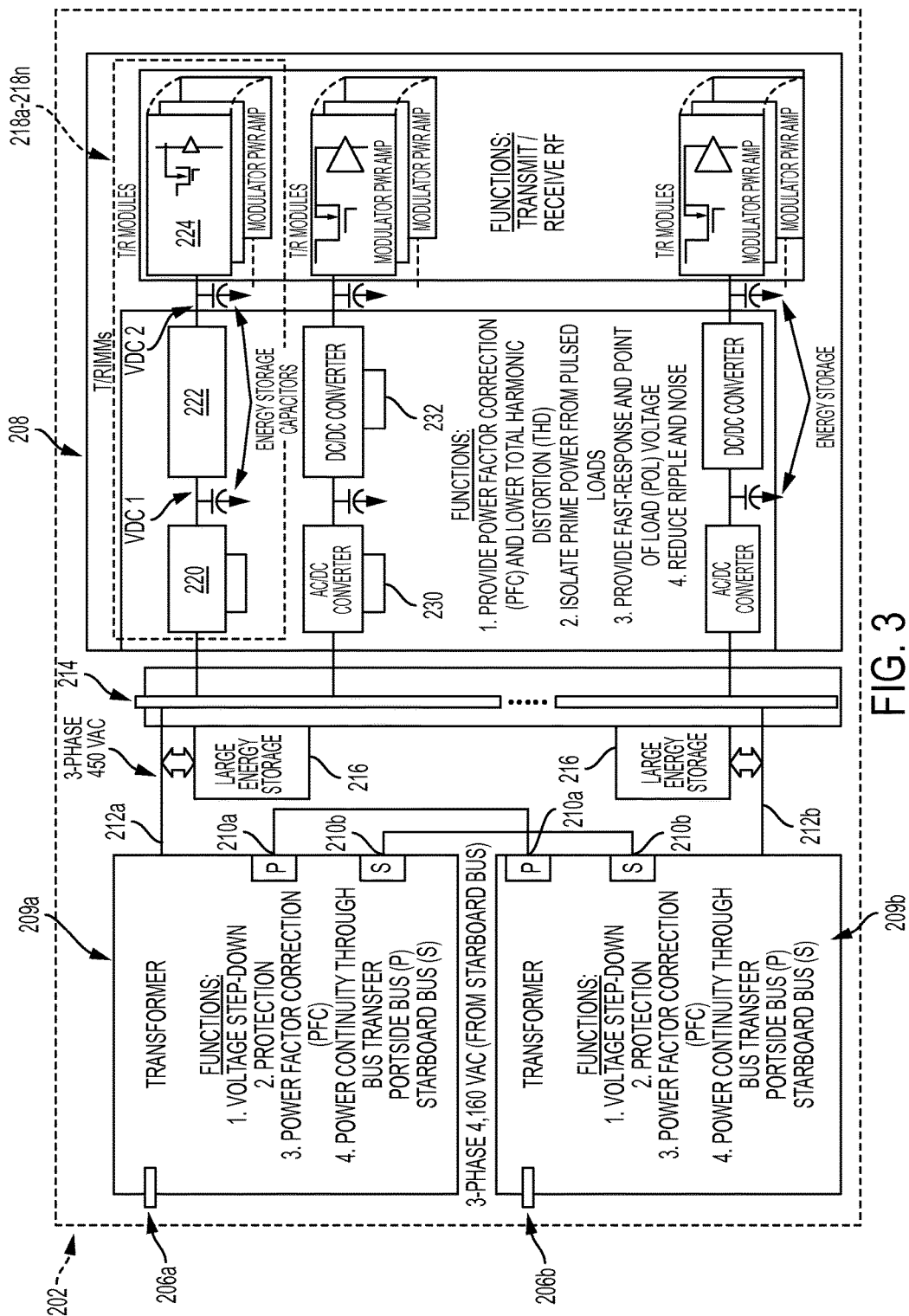
FIG. 3 is block diagram illustrating an antenna-based modular power system including a T/RIMM dual power converter antenna array according to an embodiment.
Figure 4:
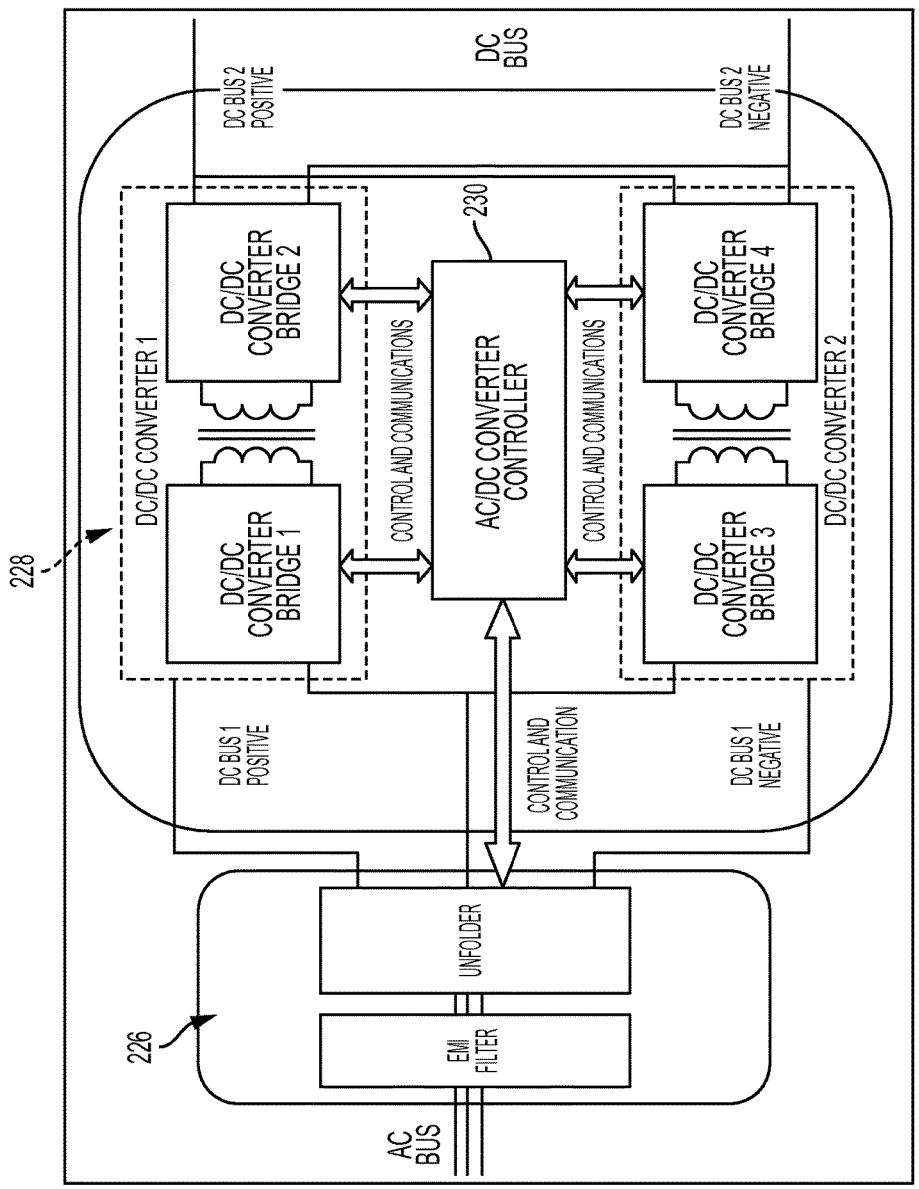
FIG. 4 is a block diagram of a DC/DC converter included in a T/RIMM dual power converter antenna arrays according to a non-limiting embodiment.

Referring now to FIGS. 2-3, a vehicle 200 including an antenna-based modular power system 202 is illustrated according to a non-limiting embodiment. The vehicle 102 includes a sea vessel 102, for example, but is not limited thereto. The antenna-based modular power system 202 includes a prime power source 204 that delivers alternating current (AC) power along two independent power buses 206a-206b. According to a non-limiting embodiment, the prime power source 204 includes a three-phase power source 204 configured to generate an AC voltage ranging from approximately 4000 volts (V) to approximately 5000 V. The AC signal generated by the prime power source 204 is ultimately converted into direct current (DC) signal to drive one or more loads 208 as discussed in greater detail below.

In the case of a sea vessel 200, for example, a first power bus, i.e., a port power bus 206a, runs along the port, while a second power bus, i.e., a starboard power bus 206b, runs along the starboard. The prime power can be delivered along both the port bus and the starboard bus 206a-206b simultaneously. Alternatively, one of the buses, e.g., the starboard bus 206b can be used as an auxiliary bus if the port bus 206a fails. Although two power buses 206a-206b are illustrated, it should be appreciated that less or more power buses can be implemented.

The antenna-based modular power system 202 further includes a three-phase transformer assembly 209a-209b coupled to a respective power bus 206a-206b, thereby receiving the initial AC signal generated by the prime power source 204. Each transformer assembly 209a-209b includes a plurality of windings (not shown) and one or more three-phase bus transfer switches (not shown). The windings can be arranged to form a three-phase transformer as understood by one of ordinary skill in the art. Each transformer assembly 209a-209b is configured to step down the initial AC voltage (e.g., 4,160 V) to generate a lowered second AC voltage (e.g., 450 V).

According to an embodiment, the transformer assemblies 209a-209b each include two bus transfer terminals 210a-210b and one output terminal 212a-212b (see FIG. 3). The two bus transfer terminals 210a-210b include for example, a port terminal 210a and a starboard terminal 210b. The port terminals 210a of each transformer assembly 209a-209b are connected to one another while the starboard terminals 212 are connected to one another. The output terminals 212a-212b of each transformer assembly 209a-209b are connected to a shared AC power bus 214. In this manner, the lowered second AC signal can be selectively delivered to the shared AC bus 214 using the port transformer assembly 209a and/or the starboard transformer assembly 209b. For example, if the transformer of the port transformer assembly 209a fails, the bus transfer switches can divert power from the port power bus 206a to the starboard transformer assembly 209b. The starboard transformer assembly 209b then converts the initial AC signal into the lowered second AC signal, and delivers the lowered second AC signal to the shared AC power bus 214.

According to a non-limiting embodiment, the system 202 includes one or more large energy devices 216 interposed between the shared AC power bus 214 and a respective transformer assembly 209a-209b. The large energy storage devices 216 include a flywheel energy storage (FES) device 216, for example, which serves to provide pulse energy to the loads 208 (e.g., antenna). In addition, the FES device 216 can serve as buffers by averaging the power draw and effectively isolating the prime power source 204 from the pulsed load 208.

Figure 1:
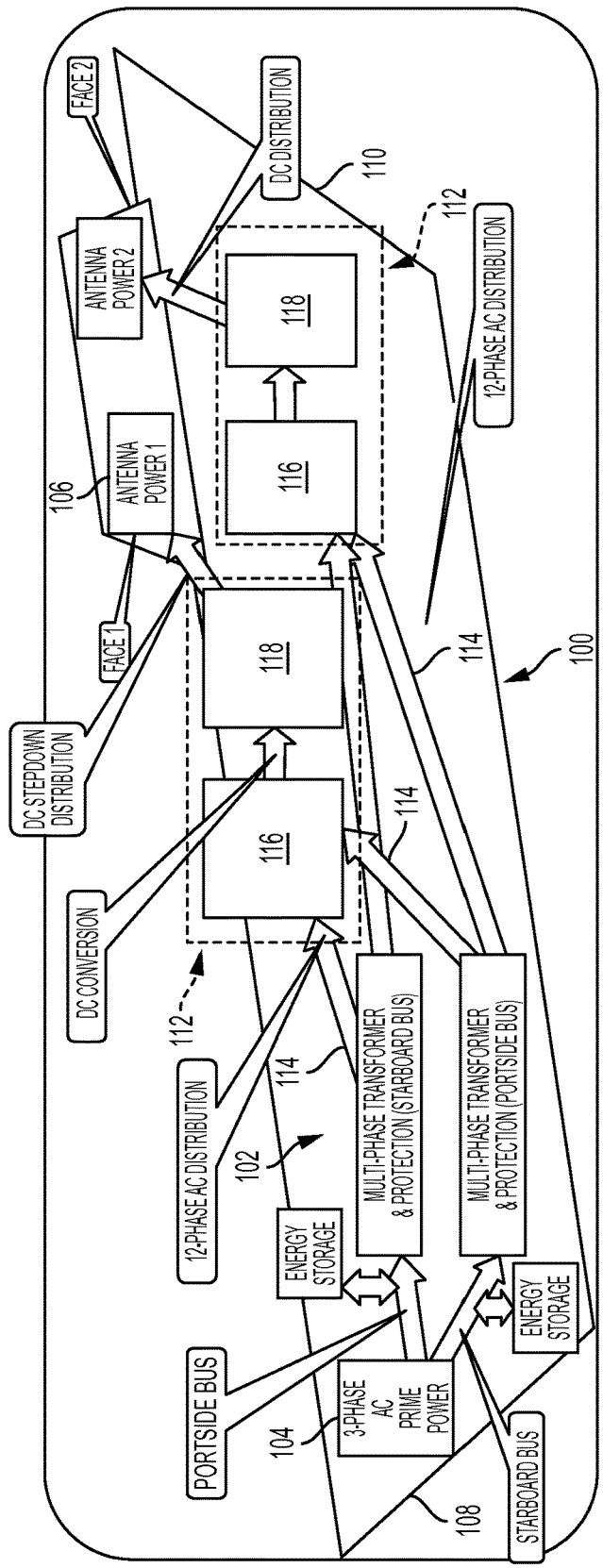
FIG. 1 illustrates a conventional power converter system implemented in a vehicle.

The loads 208 receive the lower second AC signal generated by the transformer assemblies 209a-209b. According to a non-limiting embodiment, the loads 208 include novel T/RIMM dual power converter antenna arrays 208. As further illustrate in FIG. 3, the T/RIMM dual power converter antenna arrays 208 include one or more transmit/receive (T/R) circuits 218a-218n configured to convert the second lower AC signal into a DC signal for energizing one or more radio frequency (RF) antennas. Each T/R circuit 218a-218n includes an AC/DC converter 220, a DC/DC converter 222, and a T/R modulation circuit (i.e., modulator) 224. That is, unlike conventional T/RIMM antenna arrays, at least one embodiment provides an antenna-based modular power system 202 including a novel T/RIMM dual power converter antenna array 208 having an integrated AC/DC converter 220. Accordingly, the lower second AC signal can be converted into a DC signal within a respective T/RIMM dual power converter antenna array 208 instead of requiring an intermediate module interposed between the prime power source and the load as required in conventional multi-phase alternating current (AC) power systems (see FIG. 1).

The AC/DC converter 220 is configured to convert the lower second AC signal into a first DC power signal having a first DC power level. The first DC power level may include a first DC voltage ($V_{DC1}$) ranging from approximately 1000 volts to approximately 300 volts. According to a non-limiting embodiment, the AC/DC converter 220 includes an unfolder circuit 226, one or more isolated DC-DC converters 228, and a converter controller 230. The unfolder circuit 226 is configured to selectively operate as either an AC to DC converter (AC/DC) or a DC to AC converter (DC/AC), also referred to as an inverter. In this manner, the unfolder circuit 226 can convert the second lower AC signal into a DC power which can be used to drive one more Power Amplifiers (PA), or can convert DC power generated by the DC/DC converter 222 into AC signal, which can then be added re-distributed to another T/R circuits 218n to satisfy increased power demands (e.g., increased pulse width demands) as discussed in greater detail below.

According to a non-limiting embodiment, the unfolder circuit 226 is configured as a 3-level circuit fed by a dual series-resonance converter (SRC) module which generates two modulated DC voltage waveforms. Each segment of the modulated waveform corresponds to a specific 60° segment of the 60 Hz sinusoid. The two modulated waveforms are phase-shifted relative to each other by 60°. Operating at the 60 Hz line frequency, the unfolder distributes the 60° voltage segments to produce a pure sinusoidal 60 Hz, 3-phase voltage. Unlike conventional "hard switching" PWM topologies, the unfolder circuit 226 relies on preformed sine wave segments provided by a dual SRC module. Accordingly, the unfolder circuit 226 achieves over 98% efficiency, low cost and high power density with currently available IGBTs. In addition, high efficiency can be achieved with high power density at affordable cost since unfolder circuit 226 omits the large filters typically connected at DC and AC interfaces included in the conventional "hard switching" PWM topologies. That is, instead of the typical large AC filters, the unfolder circuit 226 relies on a wide-bandwidth series resonant converter (SRC) controller to ensure high-quality AC voltage with total harmonic distortion (THD) of less than 2%.

The DC/DC converter 222 is configured to convert the first DC power signal ($V_{DC1}$) into a second DC power signal having a second DC power level that is less than the first DC power level. The second DC power level may include a second voltage ($V_{DC2}$) ranging from approximately 50 volts to approximately 8 volts. According to a non-limiting embodiment, the DC-DC converter 222 can be constructed according to an isolated SRC topology having a controlled rectifier (CR). A DC controller 232 is employed to control various switching units of the DC/DC converter 222. In this manner, reactive power at the high input line of the converter 222 can be reduced while providing zero voltage switching (ZVS) assistance currents that achieves low-loss switching across a wide range of loads (i.e., light load to full load) and a wide range of input voltages. For example, the input voltage may be a low input voltage of approximately 385 volts DC (Vdc), a nominal input voltage of approximately 560 Vdc, or a high input voltage of approximately 720 Vdc. The loads may range from light loads of about 0 W (watts) to about 5 W consumed, to high loads of about 1000 W to about 5000 W consumed. A non-limiting embodiment of the DC/DC converter 222 constructed according to an SRC topology is described in U.S. application Ser. No. 13/948,662, now published as US20150029758, which is incorporated by reference entirely herein.

The transmit/receive (T/R) modulation circuit 224 is configured to modulate the second DC power signal to generate a PWM drive signal based on the second lower DC power signal generated by the DC/DC converter 222. The PWM drive signal is then used to energize one or more power amplifiers (PAs) 224. According to a non-limiting embodiment, the T/R modulation circuit 224 includes one or more semiconductor switches (not shown). The semiconductor switch generates the PWM drive signal based on the lower second DC signal. The PA 224 amplifies the PWM drive signal to a level that is sufficient to meet the energy demands of one or more RF antennas. In at least one embodiment, the DC voltages remain the same but the ON time, i.e., the time interval at which the T/R modulation circuit 224 applies the voltage to the PA 224, is reduced. In this manner, the average power provided by both converters is reduced.

Figure 5:
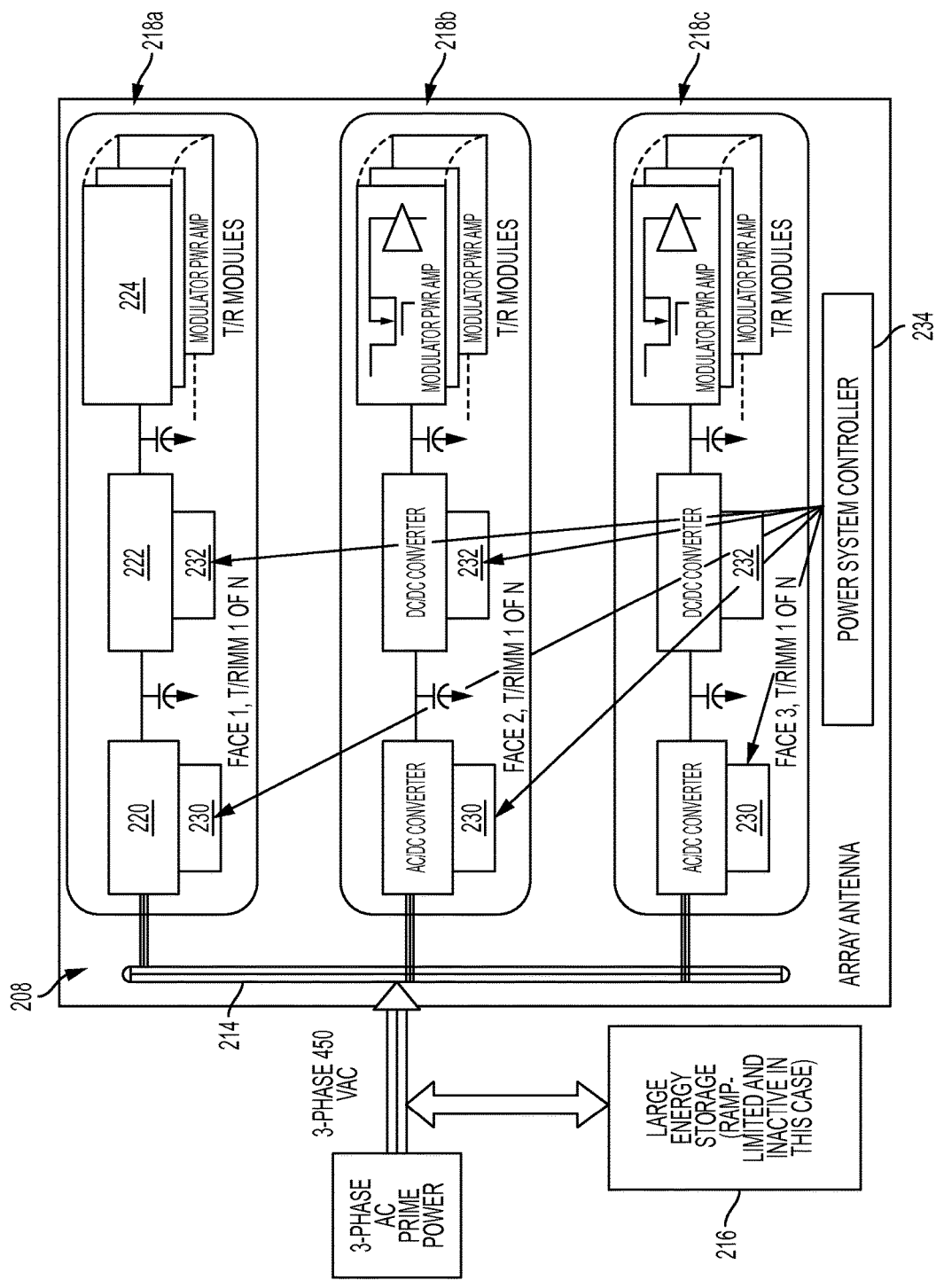
FIG. 5 is a block diagram illustrating a main T/RIMM controller configured to control a plurality of T/R circuits included in a T/RIMM dual power converter antenna arrays according to a non-limiting embodiment.

Turning now to FIG. 5, a functional diagram showing a T/RIMM dual power converter antenna array 208 including a main T/RIMM controller 234 configured to control multiple T/R circuits 218a-218c is illustrated according to a non-limiting embodiment. Group of T/R circuits 218 feed a corresponding face of an antenna array, and are connected to the AC bus 214 so to be in signal communication with one another. The T/RIMM controller 234 is in signal communication with each AC converter controller 230, DC controller 232, and T/R modulation circuit 224. In this manner, the T/RIMM controller 234 is capable of independently controlling each T/R circuit 218 so as to operate the T/RIMM dual power converter antenna array 208 in various different modes as discussed in greater detail below.

Figure 6A:
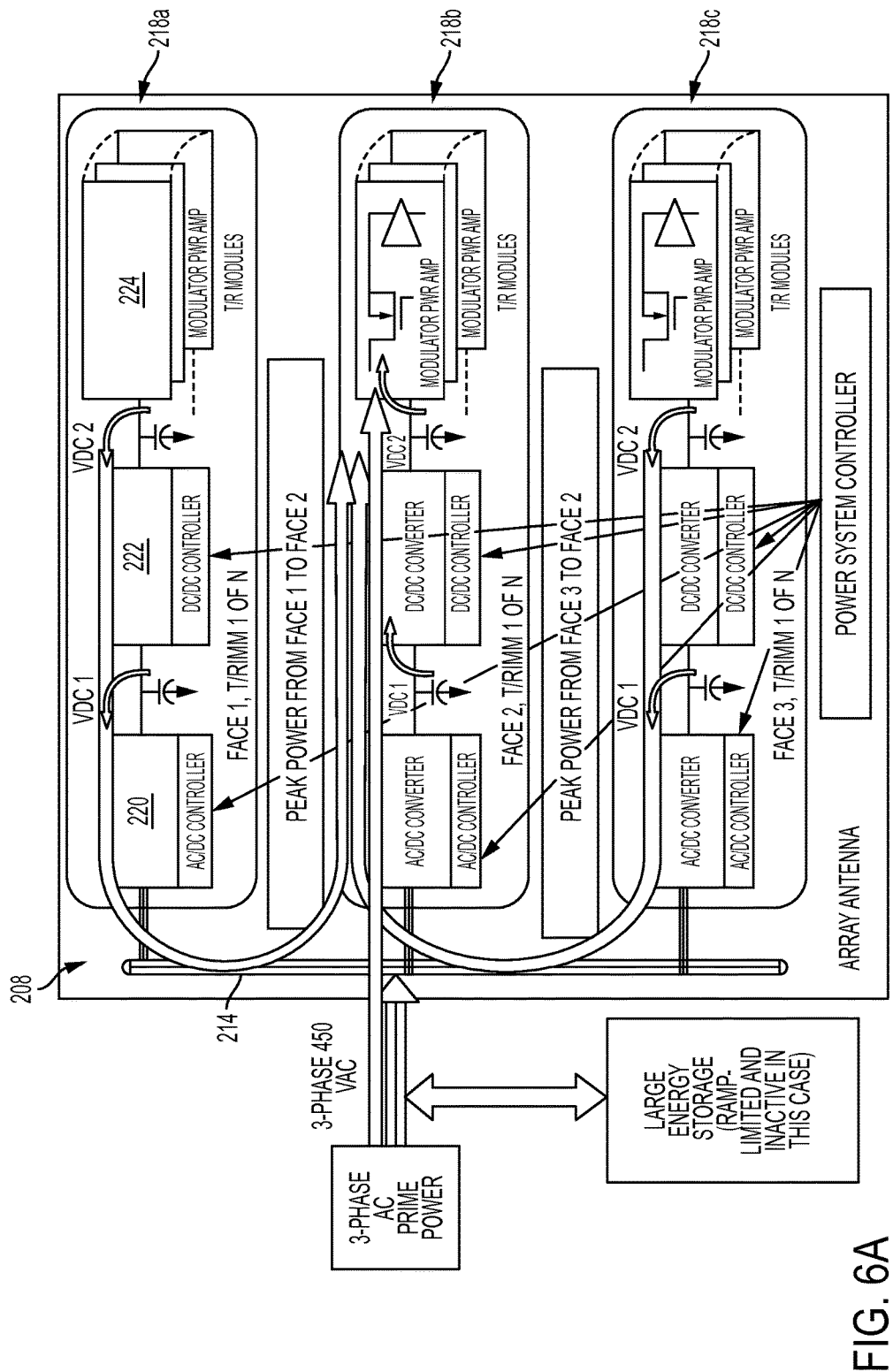
FIG. 6A is a block diagram illustrating a T/RIMM dual power converter antenna array operating in an extended power demand mode according to a non-limiting embodiment.
Figure 6B:
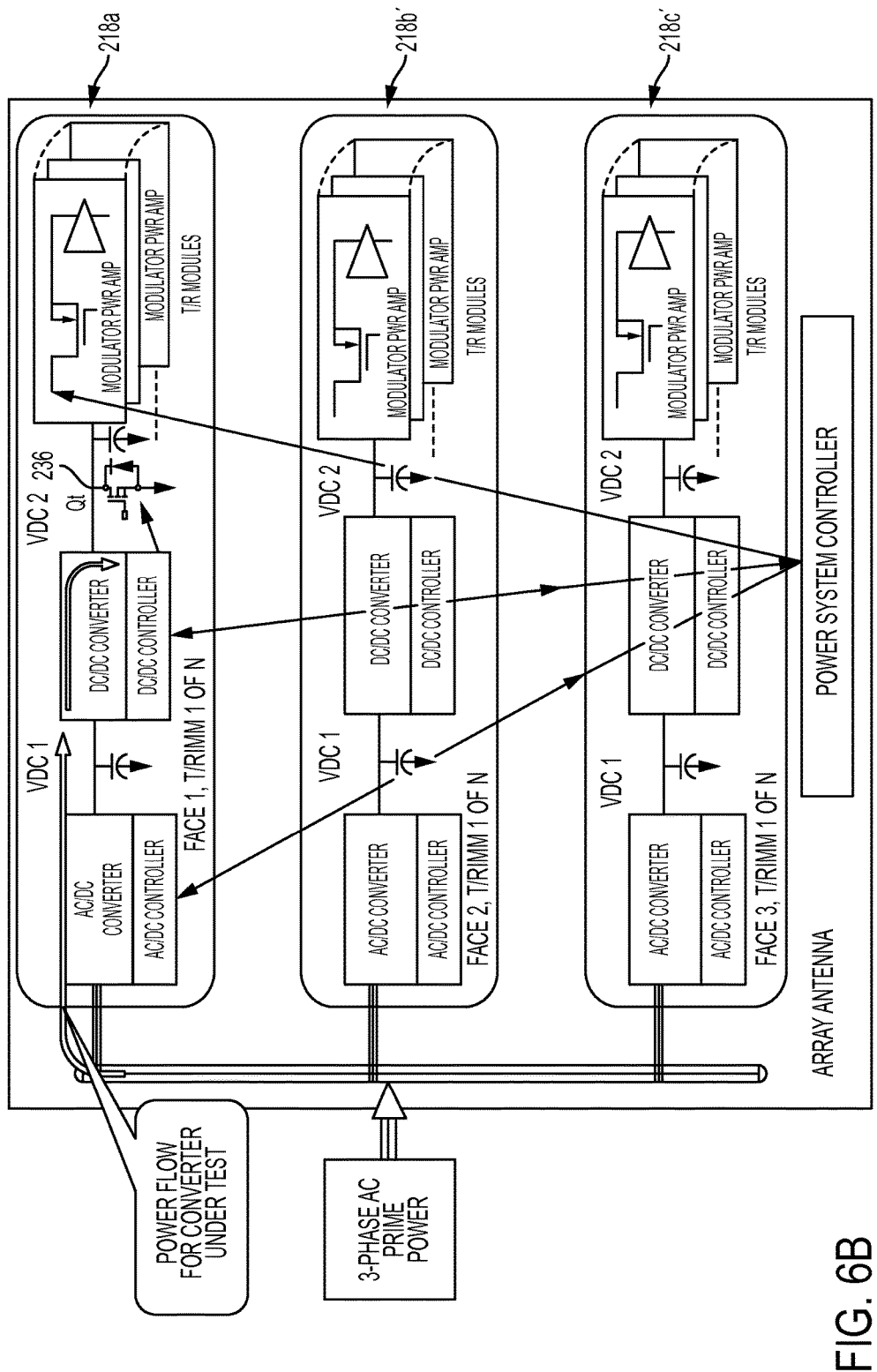
FIG. 6B is a block diagram illustrating a T/RIMM dual power converter antenna array operating in a self-test mode according to a non-limiting embodiment.

Referring to FIGS. 6A-6B, functional diagrams showing the T/RIMM dual power converter antenna array 208 operating in different modes are illustrated according to non-limiting embodiments. With reference to FIG. 6A, the T/RIMM dual power converter antenna array 208 is shown operating in an extended power demand mode. For example, T/R circuit 218b representing a second antenna face requests additional power in order to generate a PWM drive signal having an extended pulse width. However, the average power delivered to T/R circuit 218b alone is insufficient to meet the power demand necessary to generate the extended pulse width. Accordingly, the main T/RIMM controller 234 detects the demand for increased power, and initiates T/R circuit 218a and T/R circuit 218c into a reverse power operation. That is, since the T/R circuits 218a-218c are configured as bi-directional power converters, the main T/RIMM controller 234 commands both T/R circuit 218a and T/R circuit 218c to convert DC power into AC signal. The converted AC signal is applied to the AC bus 214, and delivered to the T/R circuit 218b corresponding to the second antenna face. In this manner, T/R circuit 218b is supplied with increased power necessary to generate the extended pulse width.

Referring to FIG. 6B, the T/RIMM dual power converter antenna array 208 is shown operating in self-test mode, which can diagnose operation of an individual main T/R circuit 218. For instance, the main T/RIMM controller 234 receives a request to initiate a self-test operation to diagnose T/R circuit 218a representing face 1 of an antenna. In response to the self-test request, the main T/RIMM controller 234 deactivates the T/R circuits 218b' and 218c', and activates T/R circuits 218a. Prime power is then applied to the AC bus 214 and is delivered to T/R circuit 218a, and the main T/RIMM controller 234 commands the DC/DC converter 222 to execute a test profile. The test profile includes, for example, executing operation from short circuit to zero current including pulse load. According to an embodiment, the T/RIMM DC/DC converter 222 operates as a programmable current sink. In an additional, a test transistor 236 may be connected across the output of the DC/DC converter 222. The test transistor 236 is controlled by the main T/RIMM controller 234 in a linear mode. In this manner, the test transistor 236 provides extended testing capabilities including, for example, constant power load analysis, etc. As the DC/DC converter 222 executes the test profile, the main T/RIMM controller 234 monitors various parameters (e.g. efficiency, case temperature rise, etc.) of the AC/DC converter 220, the DC/DC converter 222 and/or the T/R modulating circuit 224.

Figure 6C:
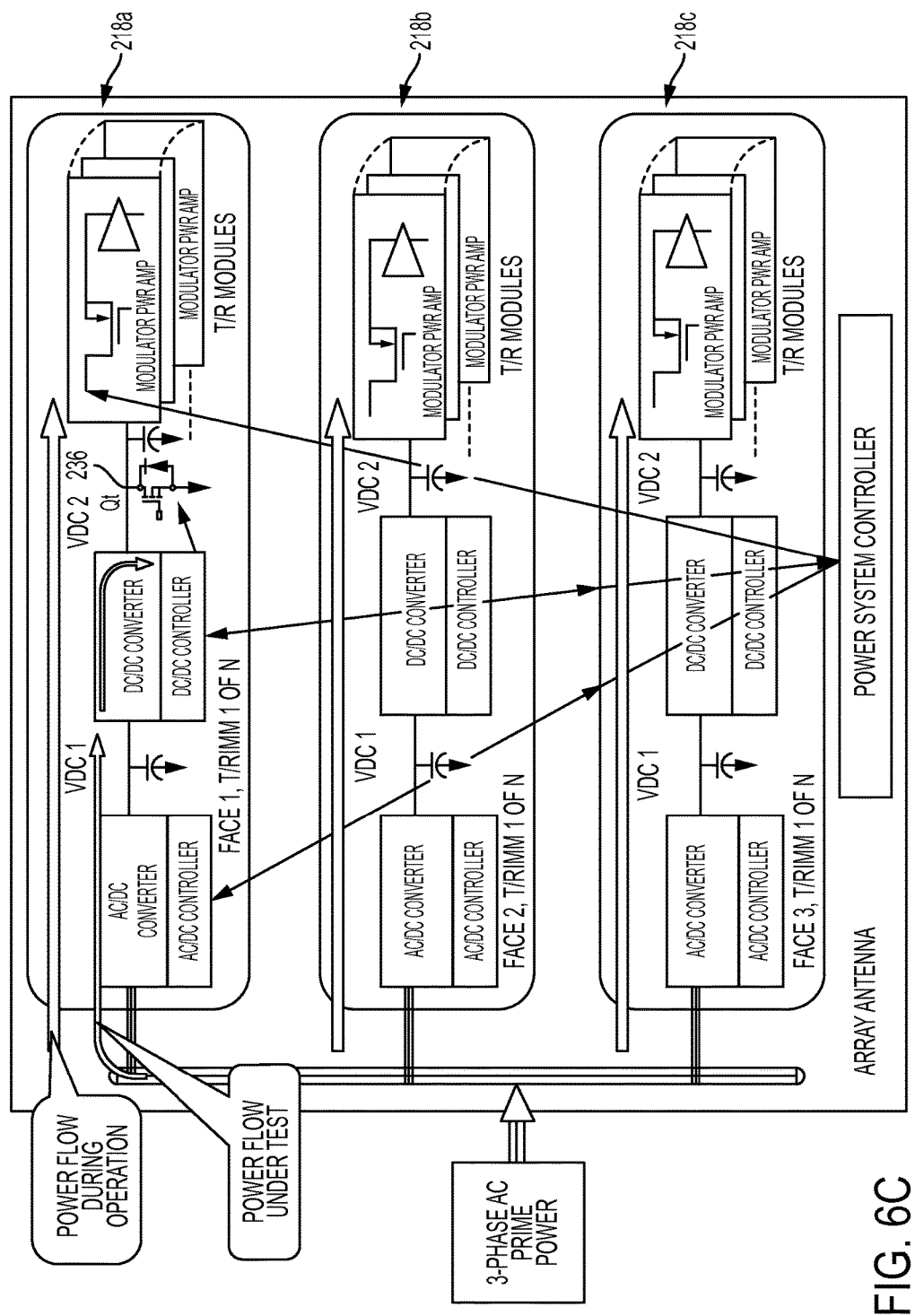
FIG. 6C is a block diagram illustrating a T/RIMM dual power converter antenna array operating in an online diagnostics mode according to a non-limiting embodiment according to an exemplary embodiment.

Referring to FIG. 6C, the T/RIMM dual power converter antenna array 208 is shown operating in an on-line diagnostics mode. The on-line diagnostics mode is configured to diagnose one or more of the T/R circuits 218a-218c without first requiring a request to test a particular T/R circuits 218a-218c. For example, the main T/RIMM controller 234 detects abnormal operating conditions during real-time operation of the antenna-based modular power system 202. The abnormal operating conditions include, but are not limited to, power output failure, excessive power dissipation, and excessive operating temperatures. For example, the main T/RIMM controller 234 may compare various real-time output parameters (output voltage, output current, operating temperatures) to pre-stored nominal values, and determine an abnormal condition if one or more real-time output parameters exceeds a corresponding pre-stored nominal value.

In addition, the main T/RIMM controller 234 may continuously monitor operation of the AC controller 230 and/or the DC controller 232, and store the operating data of the controller 230-232 for subsequent analysis. The operating data includes, but is not limited to, control efficiency, controller temperature, power consumption, etc. Based on the diagnosis performed by the main T/RIMM controller 234, various counter measures may be performed. For example, a warning alert may be generated in response to detecting an abnormal condition. In addition, the main T/RIMM controller 234 can disconnect one or more of the T/R circuits 218a-218c in response to detecting an abnormal condition, i.e., a short circuit condition. The main T/RIMM controller 234 can also command a particular T/R circuit 218a-218c to operate at reduced power. In this manner, an abnormal T/R circuit may still provide a limited level power if requested by the system 202.

As discussed above, various embodiments of the disclosure provide an antenna-based modular power system that includes a three-phase transformer coupled to a bus transfer switching unit to distribute three-phase AC prime power to one or more remotely located T/RIMM dual power converter antenna arrays. Each T/RIMM dual power converter antenna array is configured to perform the majority of the power conversion processing. Accordingly, conventional intermediate power conversion sub-systems and large bulky multiphase transfer switches power cables/buses are unnecessary and can be omitted. In this manner, a smaller, lighter and a more efficient power system can be implemented on the vehicle compared to the conventional multi-phase alternating current (AC) power distribution systems.

As used herein, the term "module" refers to an application specific integrated circuit (ASIC), an electronic circuit, a computer processor (shared, dedicated, or group) and memory that executes one or more software or firmware programs, a combinational logic circuit, a microcontroller including various inputs and outputs, and/or other suitable components that provide the described functionality. When implemented in software, a module can be embodied in memory as a non-transitory machine-readable storage medium readable by a processing circuit (e.g., a microprocessor) and storing instructions for execution by the processing circuit for performing a method.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:
1. An antenna-based modular power system, comprising:
a prime power supply configured to generate a first alternating current (AC) power signal having a first AC voltage level;
at least one transformer configured to convert the first AC voltage signal into a second AC voltage signal having a second voltage level less than the first AC level; and
at least one Transmit or Receive Integrated Microwave Module (T/RIMM) dual power converter antenna array in signal communication with the at least one transformer, the at least one T/RIMM dual power converter antenna array including at least one antenna and an AC/DC converter embedded therein to convert the second AC voltage signal into a DC power drive signal to energize the at least one antenna, the AC/DC converter comprising:
at least one frequency unfolder circuit configured to generate a power-corrected rectified signal based on the second AC voltage signal;
at least two isolated series resonant DC/DC converters configured to generate the first DC power signal based on the power-corrected rectified signal,
wherein the at least one T/RIMM dual power converter antenna array further includes a DC/DC converter in signal communication with the AC/DC converter, the DC/DC converter configured to convert a first DC power signal having a first DC power value output by the AC/DC converter into the DC power drive signal having a second DC power value that is less than the first DC power value.

2. The antenna-based modular power system of claim 1, wherein the at least one T/RIMM dual power converter antenna array further includes a transmit/receive (T/R) modulation circuit that receives the DC power drive signal and generates a pulse width modulated (PWM) DC signal that energizes the at least one power amplifier.

3. The antenna-based modular power system of claim 2, further comprising a T/RIMM processor configured to drive the at least one T/RIMM dual power converter antenna array according to a plurality of different operating modes.

4. The antenna-based modular power system of claim 3, wherein the at least one T/RIMM dual power converter antenna array includes a plurality of T/RIMM dual power converter antenna arrays, and wherein the T/RIMM processor controls a first T/RIMM dual power converter antenna array based on a power level demanded by a second T/RIMM dual power converter antenna array different from the first T/RIMM dual power converter antenna array.

5. The antenna-based modular power system of claim 4, wherein the plurality of T/RIMM dual power converter antenna arrays are connected in parallel with each other, and wherein the AC/DC converter and the DC/DC converter configured to provide bidirectional power distribution.

6. The antenna-based modular power system of claim 1, further comprising an AC power bus interposed between the at least one transformer and the at least one Transmit or Receive Integrated Microwave Module (T/RIMM) dual power converter antenna array to receive the second AC voltage signal.

7. The antenna-based modular power system of claim 6, wherein the AC/DC converter is connected directly to the AC power bus so as to directly receive the second AC voltage signal.

8. The antenna-based modular power system of claim 7, further comprising at least one energy storage device connected between the prime power supply and the AC power bus.

9. The antenna-based modular power system of claim 8, wherein the at least one energy storage device is a flywheel energy storage (FES) device.

10. The antenna-based modular power system of claim 1, wherein the first AC voltage signal includes a first AC voltage ranging from approximately 4000 volts (V) to approximately 5000V, and wherein the second AC voltage signal includes a second voltage ranging from approximately 400 V to approximately 500 V.

11. A Transmit or Receive Integrated Microwave Module (T/RIMM) dual power converter antenna array, comprising:
a plurality of transmit/receive circuits configured to energize at least one power amplifier, each transmit/receive circuit comprising:
an AC/DC converter configured to convert an AC signal into a first DC power signal having a first DC power level;
a DC/DC converter configured to convert the first DC power signal into a second DC power signal having a second DC power level less than the first DC power level; and
a transmit/receive (T/R) modulation circuit configured to modulate the second DC power signal to generate a PWM drive signal, wherein the PWM drive signal energizes the at least one power amplifier; and
a T/RIMM processor configured to control a power distribution of the plurality of transmit/receive circuits, and to control a first transmit/receive circuit based on a power level demanded by a second transmit/receive circuit different from the first T/RIMM dual power converter antenna array,
wherein the plurality of transmit/receive circuits are each configured to provide bi-directional power output, and wherein the plurality of transmit/receive circuits are connected in parallel with one another.

12. The T/RIMM dual power converter antenna array of claim 11, wherein the T/RIMM processor commands the first transmit/receive circuit to output a first power to the second transmit/receive so as to extend a pulse width of the PWM drive signal to satisfy the power level demand.

13. The T/RIMM dual power converter antenna array of claim 11, wherein the T/RIMM processor activates a first transmit/receive circuit while deactivating remaining transmit/receive circuits, and performs at least one diagnostic test to diagnose the AC/DC converter and the DC/DC converter.

14. The T/RIMM dual power converter antenna array of claim 13, wherein the at least one diagnostic test includes:
a first test to determine at least one of a failed AC/DC converter or a failed DC/DC converter of the first transmit/receive circuit; and
a second test to determine power efficiency of the first transmit/receive circuit.

15. The T/RIMM dual power converter antenna array of claim 11, wherein the T/RIMM processor performs at least one diagnostic test while a plurality of transmit/receive circuits generate the second DC power signal, and wherein the T/RIMM processor commands a first transmit/receive circuit to reduce a respective second DC power level in response to a failed diagnostic test.

16. The method of claim 11, further comprising executing at least one diagnostic test while generating the second DC power signal, and wherein the T/RIMM processor commands a first transmit/receive circuit to reduce a respective second DC power level in response to a failed diagnostic test.

17. A method of controlling a Transmit or Receive Integrated Microwave Module (T/RIMM) dual power converter antenna array, the method comprising:
energizing at least one power amplifier using a plurality of transmit/receive circuits, wherein energizing each transmit/receive circuit includes:
converting an AC voltage signal into a first DC power signal having a first DC power level;
converting the first DC power signal into a second DC power signal having a second DC power level less than the first DC power level;
modulating the second DC power signal to generate a PWM drive signal that energizes the at least one power amplifier; and
distributing power among the plurality of transmit/receive circuits to activate a first transmit/receive circuit while deactivating remaining transmit/receive circuits so as to execute at least one diagnostic test to diagnose at least one of an AC/DC converter configured to generate the first DC power signal and a DC/DC converter configured to generate the second DC power signal.

18. The method of claim 17, wherein a T/RIMM processor activates the first transmit/receiver circuit while deactivating remaining transmit/receiver circuits, and executing at least one diagnostic test to diagnose the AC/DC converter and the DC/DC converter.

19. The method of claim 18, wherein executing the at least one diagnostic test includes:

performing a first test to determine at least one of a failed AC/DC converter or a failed DC/DC converter of the first transmit/receive circuit; and performing a second test to determine power efficiency of the first transmit/receive circuit.

* * * * *